TUNER

Filed May 7, 1949

INVENTOR.
Grover F. Behringer.
BY Bair & Freeman
Att'ys.

Patented Nov. 28, 1950

2,532,051

UNITED STATES PATENT OFFICE 2,532,051

TUNER

Grover F. Behringer, Defiance, Ohio, assignor, by mesne assignments, to Belmont Radio Corporation, Chicago, Ill., a corporation of Illinois Application May 7, 1949, Serial No. 91,909

8 Claims. (Cl. 250—40)

This invention relates to a tuner for radio circuits and the like, and particularly those types which require a movable element to move tuning elements, such as iron cores of inductor-type tuners, which are used especially in connection with television.

One object of the invention is to provide a simple mechanical means for moving a tuning element upon rotation of a control knob or the like, the tuning element being connected with the iron core for moving it, or with a rotor of a variable plate-type condenser or other movable tuning element.

Another object is to provide the mechanical means referred to in the last paragraph with a simple means for also shifting a switch bar and thereby establish different circuits for tuning a plurality of wave channels in two non-contiguous frequency ranges so that one range is tuned when the tuning element is moved in opposite directions during one half the revolution of an adjusting shaft and another frequency range is tuned during movement in opposite directions during the other half revolution of the control shaft.

Still another object is to provide a mechanical means for moving a tuning element which is comparatively simple and formed of a minimum of parts, a control shaft having a pair of crank pins connected by links to the tuning element, which element slides in a pair of slots for properly guiding the inductance cores, and springs being provided in connection with the links for eliminating any lost play in the parts.

A further object is to provide the crank pins on discs which are provided with cam elements to shift a switch bar in one direction when the control shaft rotates in one direction and in the opposite direction when the control shaft rotates in the opposite direction; the shifting of the switch bar being accomplished adjacent a dead center position of the links so the necessary movement for shifting the switch bar is had at a time when the tuning element is moving a minimum amount.

Still a further object is to provide indicating means associated with the control shaft for indicating various positions of the shaft, the indicating dial being located behind a sight opening in a panel so that only a minimum portion of the indicia thereon shows through the sight opening and variously spaced indicia thereon are therefore not evident.

An additional object is to provide the indicating dial of transparent or translucent character and a means to illuminate the same so the indicia thereon can readily be seen through the side opening.

With these and other objects in view, my invention consists in the construction, arrangement and combination of the various parts of my device whereby the objects contemplated are attained, as hereinafter more fully set forth, as pointed out in my claims and as illustrated in the accompanying drawings, wherein:

Figures 1, 2, 3, 4, 5, 6:
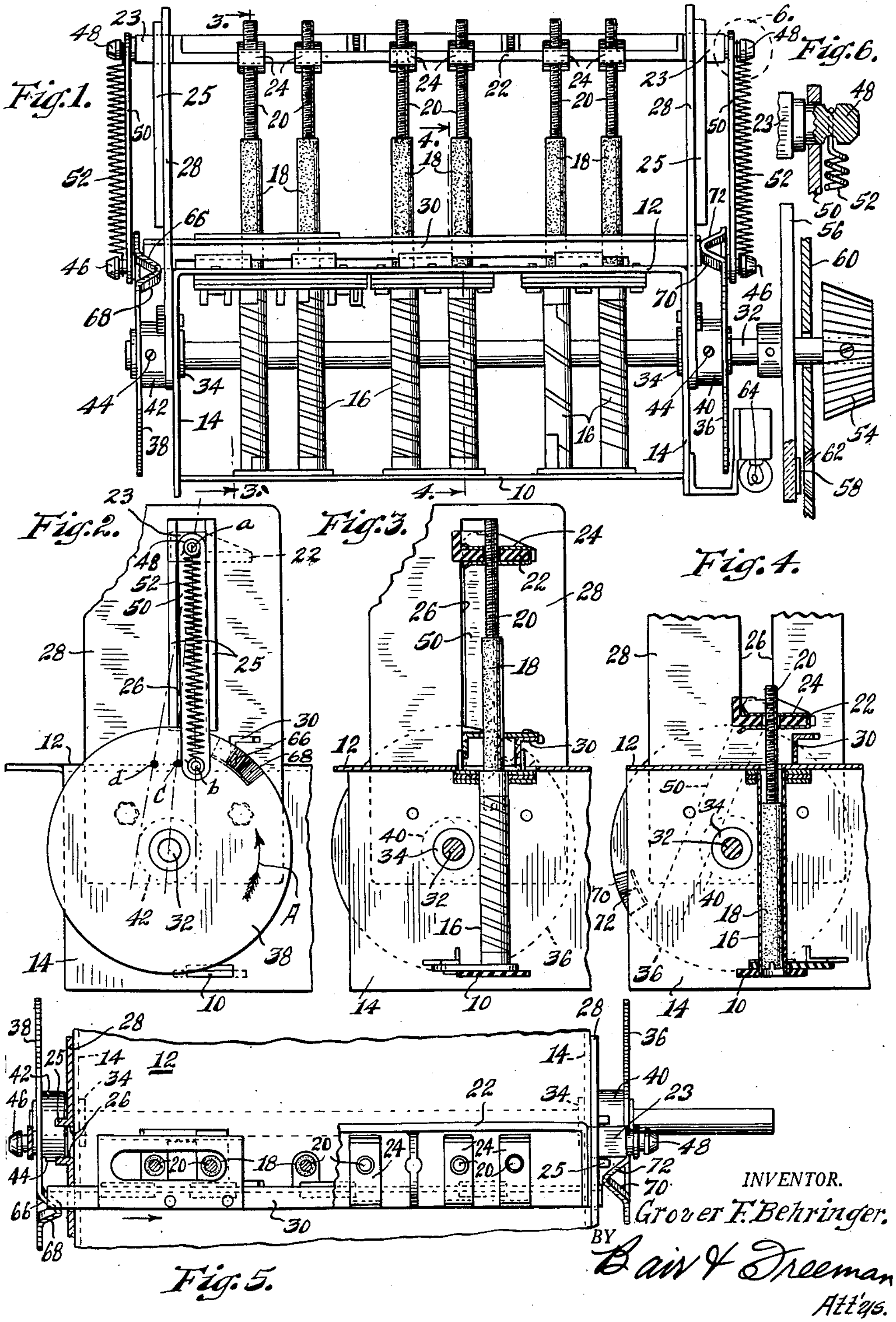
Figure 1 is an elevation of a tuner embodying my present invention, the tuner shown being particularly designed for television operation.
Figure 2 is an end elevation of the left end of Figure 1.
Figure 3 is a sectional view on the line 3—3 of Figure 1, the tuning element being in the raised position.
Figure 4 is a similar sectional view on the line 4—4 of Figure 1 with the tuning element in the lowered position.
Figure 5 is a partial plan view of Figure 1.
Figure 6 is an enlarged sectional view of the portion of Figure 1 within the circle 6.

On the accompanying drawing I have used the reference numeral 10 to indicate a base plate, 12 a top plate, and 14 end plates of a casing for inductor-type tuning devices of a television set or the like. These tuning devices comprise tubular elements 16 wound with metallic ribbons in which inductor cores 18 are slidable. The cores are usually made of powdered iron. They are provided with rods 20 which are threaded through a tuning element 22 with metal clips 24 serving to connect them to the element 22. The lower ends of the cores are slotted to receive the blade of a screw driver for adjustment purposes.

The tuning element 22 has reduced extensions 23 vertically slidable between flanges 25 formed in upright plates 28, the flanges in turn defining vertical slots 26 in which the bar slides. These slots are aligned with the tubular cores 16 so that as the bar 22 is raised and lowered, it does not cause binding of the cores 18 in the tubes.

Television broadcasting is practiced at present in a plurality of frequency ranges and the various tuning cores 18 may be made to do double duty by switching from one range to another during certain movements of the cores. This is usually accomplished by means of a switch bar 30 slidably mounted on the top plate 12 and provided with suitable contacts to coact with stationary contacts. The mechanism thus far described forms no part of my present invention which is concerned only with the mechanical means for adjusting the tuning element or bar 22 vertically in the slots 26 defined by the flanges 25 and with the means for shifting the switch bar 30. No effort has been made to show the various switch contacts operated by this bar nor the circuits involved which are shown in the copending application of Elmer L. Hall, Serial No. 53,447, filed October 8, 1948.

Describing my contribution to the prior art, the means for adjusting the tuning bar 22 comprises a shaft 32 rotatable in bearings 34 of the end plates 14. A pair of discs 36 and 38 are provided with hubs 40 and 42 which are mounted on the control shaft 32 by set screws 44. These discs carry crank pins 46 and the ends of the bar 22 carry similar pins 48. Links 50 connect the pins 46 and 48 together, the links being perforated at the ends for receiving the pins as shown in Figure 6. To prevent lost motion in the parts, the pins 46 and 48 are connected together by springs 52, which arrangement serves to accurately position the cores 18 at predetermined positions in relation to corresponding positions of the shaft 32 at all times. This also insures that the cores will be accurately positioned in relation to indicia on an indicating dial as will hereinafter appear.

The control shaft 32 may be rotated either directly or indirectly. To rotate it directly, a knob 54 is illustrated thereon whereas indirect rotation would consist of a drum on the shaft 32 with a flexible element wound on the drum and wound on a smaller shaft to which the control knob is attached in the usual manner for many radio and television receivers.

In either event, it is desirable to have a type of indicating device that does not permit the operator to see many of the indicia at one time, which indicia are usually variously spaced because of the variation in channels for which the particular tuner is designed.

I therefore provide an indicator dial 56 with indicia thereon, as indicated at 58, back of a panel 60 that covers the television tuning apparatus, and the panel has a sight opening 62 therein through which only a limited number of the indicia may be observed. Preferably also the indicating dial 56 is translucent or transparent and a small electric light 64 is provided for illuminating the indicia so they are more clearly seen through the side opening.

From the foregoing description, it is obvious that I have provided a relatively simple means for moving the tuning bar 22 vertically in its guide slots. The number of parts necessary for accomplishing this result has been reduced to a minimum and a desirable type of indicating means has been disclosed for indicating the various channels to which the tuner is tuned. The indicating means is merely for a rough adjustment whereas fine adjustment is accomplished by the operator observing the image on the television screen and adjusting the shaft 32 until the image is clearest. After a few minutes of operation the tuner may require slight readjustment to bring the cores 18 to the best operating position.

In order to shift the switch bar 30, I provide a very simple means consisting of cam elements 66 and 68 on the disc 38, and other cam elements 70 and 72 on the disc 36. These cam elements are sheared from the disc and bent to the shape shown particularly in Figures 1 and 5 and are adapted to rotate in circular paths coincident with the ends of the sliding switch bar 30.

Referring to Figure 2, three center lines of the link 50 are indicated as *ab*, *ac* and *ad*. Assuming the disc 38 to be rotating in the direction of the arrow A, the cam element 66 has just engaged the left-hand end of the bar 30 in Figure 1 and is ready to shift it toward the right. In Figure 2, this position of the link is indicated as *ab*.

As the disc 38 is rotated toward the left, the link will finally assume an on-center position *ac* by which time the peak between the cam element 66 and 68 will have engaged the bar 30 for completing the sliding movement thereof. Thereafter, the disc 38 can rotate further in the counter-clockwise direction for moving the link 50 to the position *ad* about the same distance on the opposite side of the line *ac* as the line *ab*, and continued movement lowers the tuning bar 22 until it finally reaches the position of Figure 4.

During this travel, of course, the cores 18 pass through the several tuning channels and when the disc is rotated in the opposite direction, the cores pass through these channels in opposite order. When the position *ad* is reached, however, the cam 70 engages the right end of the bar 30 in Figure 1 for shifting the bar back in the other direction, the shifting movement being completed by the time the link reached the *ac* position. Thus the shifting of the switch bar is accomplished adjacent the top dead-center position of the link 50 when there is very slight movement of the tuning cores 18, and their movement is thus not wasted during the switching operation but is increased in proportion to the rotation of the control shaft 32 after the switching operation. This permits minimizing the travel of the cores 18 and at the same time getting the desired switching action by means of a satisfactory arc of movement of the control shaft 32 at a time when it is not moving the cores 18 any appreciable distance.

From the construction of the parts just described it will obvious that a very simple means for shifting the switch bar 30 is provided, which means can be readily fabricated as it consists merely of a shearing and forming operation performed on the sheet metal discs 36 and 38.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a tuner of the character disclosed having a movable tuning element, a frame having slots in which said element is slidable, means for sliding said element along said slots comprising an oscillatable shaft, a pair of crank pin discs carried thereby, crank pins on said crank pin discs, pins projecting from said tuning element, links connecting said crank pins and said last pins together, a control knob secured to said shaft for oscillating the same to effect the tuning operation, and springs connecting the pins together to take up play in the parts.

2. In a tuner of the character disclosed having a movable tuning element, a frame having slots receiving said element, means for moving said element in said slots comprising an oscillatable shaft, a pair of crank pin discs carried thereby, crank pins on said crank pin discs, pins projecting from said tuning element, links connecting said crank pins and said last pins together, and a control knob secured to said shaft for oscillating the same to effect the tuning operation.

3. In a tuner of the character disclosed having an elongated movable tuning element, means for moving said element comprising a shaft, said tuning element being arranged substantially parallel to said shaft and guided adjacent its ends for movement toward and away from said shaft, a plurality of tuning devices connected to said tuning element between said guide means, a pair of spaced discs on said shaft, a crank pin carried by each disc, pins projecting from the ends of said tuning element, and links connecting said crank pins and said last pins together.

4. In a tuner having an elongated tuning element, a frame having slots in which said tuning element travels and a switch bar slidably mounted on said frame, means to actuate said tuning element and said switch bar comprising a control shaft, a pair of discs thereon at opposite ends of said switch bar, crank pin and link connections between said discs and the ends of said tuning element, and cam elements formed on said discs for sliding said bar, said cam elements being offset in relation to each other whereby the bar is slid in one direction by the cam elements on one disc and in the opposite direction by the cam elements on the other disc, the sliding being accomplished adjacent the dead-center position of said links whereby switch bar operation occurs when the travel of said tuning element is at a minimum in relation to the rotation of said control shaft.

5. In a tuner of the character disclosed having a movable tuning bar and a switch bar, a frame having slots in which said tuning bar slides laterally, said switch bar being mounted for endwise sliding movement on said frame, means to actuate said tuning element and said switch bar comprising a control shaft, a pair of discs thereon, crank pin and link connections between said discs and the ends of said tuning bar including springs connecting the pins together for taking up lost motion, and cam elements formed on said discs for shifting said bar, said cam elements being offset in relation to each other whereby the bar is shifted in one direction by the cam element on one disc engaging one end of the switch bar when the shaft rotates in one direction and in the opposite direction by the cam element on the other disc engaging the other end of the switch bar when the shaft rotates in the opposite direction.

6. In a tuner having an elongated tuning element, slots in which said tuning element travels and a switch bar slidably mounted on said frame, means to actuate said tuning element and said switch bar comprising a control shaft, a pair of discs thereon, crank pin and link connections between said discs and said tuning bar, and cam elements formed on said discs for engaging opposite ends of said bar and shifting it adjacent the dead-center position of said links whereby switch bar operation occurs when the travel of said tuning element is at a minimum in relation to the rotation of said control shaft.

7. In a tuner of the inductance type having inductance cores connected with a tuning element and a switch operating bar, means to move said tuning element and shift said switch bar comprising discs having crank pin and link connections with said tuning element and having cam elements for engaging the ends of said switch bar for oppositely shifting it at a position adjacent the dead-center position of said links.

8. In a tuner of the inductance type having inductance cores connected with a tuning element and a switch operating bar, means to move said tuning element and shift said switch bar comprising a pair of discs at opposite ends of said switch bar and having crank pin and link connections with said tuning element, one of said discs having cam elements for engaging one end of said switch bar for shifting it in one direction at a position adjacent the dead-center position of said links and the other disc having cam elements for engaging the other end of said switch bar for shifting it in the opposite direction at a position adjacent the dead-center position of said links.

GROVER F. BEHRINGER.

REFERENCES CITED

The following references are of record in the file of this patent:

UNITED STATES PATENTS

| Number | Name | Date |
|---|---|---|
| 861,369 | Kidder | July 30, 1907 |
| 1,464,662 | Ritz | Aug. 14, 1923 |
| 2,074,447 | Wunning | Mar. 23, 1937 |
| 2,217,984 | Kirk | Oct. 14, 1940 |
| 2,259,719 | Allen | Oct. 21, 1941 |
| 2,344,091 | Kirk | Mar. 14, 1944 |